(12) United States Patent
Lesso (10) Patent No.: US 11,437,022 B2
(45) Date of Patent: *Sep. 6, 2022

(54) PERFORMING SPEAKER CHANGE DETECTION AND SPEAKER RECOGNITION ON A TRIGGER PHRASE

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/901,092

(22) Filed: Jun. 15, 2020

(65) Prior Publication Data

US 2020/0312305 A1 Oct. 1, 2020

Related U.S. Application Data

(63) Continuation of application No. 15/907,630, filed on Feb. 28, 2018, now Pat. No. 10,726,829.

(51) Int. Cl.
*G10L 15/08* (2006.01)
*G10L 17/06* (2013.01)
(52) U.S. Cl.
CPC .............. *G10L 15/08* (2013.01); *G10L 17/06* (2013.01); *G10L 2015/088* (2013.01)

(58) Field of Classification Search
CPC ................................................. G10L 2015/088
See application file for complete search history.

(56) References Cited

U.S. PATENT DOCUMENTS

| 7,039,951 | B1 | 5/2006 | Chaudhari et al. |
| 9,368,105 | B1 | 6/2016 | Freed et al. |
| 9,548,053 | B1 | 1/2017 | Basye et al. |
| 10,726,829 | B2 * | 7/2020 | Lesso .................. G10L 17/06 |
| 2008/0195387 | A1 | 8/2008 | Zigel et al. |
| 2013/0080167 | A1 | 3/2013 | Mozer |
| 2015/0066494 | A1 | 3/2015 | Salvador et al. |
| 2016/0035349 | A1 | 2/2016 | Jung et al. |
| 2016/0093304 | A1 | 3/2016 | Kim et al. |
| 2016/0180852 | A1 | 6/2016 | Huang et al. |
| 2018/0082689 | A1 | 3/2018 | Khoury |

* cited by examiner

*Primary Examiner* — Jesse S Pullias
(74) *Attorney, Agent, or Firm* — Jackson Walker L.L.P.

(57) ABSTRACT

A method of speaker recognition comprises receiving an audio signal representing speech. A speaker change detection process is performed on the received audio signal. A trigger phrase detection process is also performed on the received audio signal. On detecting the trigger phrase in the received audio signal, a speaker recognition process is performed on the detected trigger phrase and on any speech preceding the detected trigger phrase and following an immediately preceding speaker change.

19 Claims, 6 Drawing Sheets

PERFORMING SPEAKER CHANGE DETECTION AND SPEAKER RECOGNITION ON A TRIGGER PHRASE

The present disclosure is a continuation of U.S. patent application Ser. No. 15/907,630, filed Feb. 28, 2018, which is incorporated by reference herein in its entirety.

TECHNICAL FIELD

The embodiments described herein relate to a method and system for use in a voice user interface, for example for allowing a user to control the operation of a device using speech.

BACKGROUND OF THE INVENTION

Voice user interfaces are provided to allow a user to interact with a system using their voice. One advantage of this, for example in devices such as smartphones, tablet computers and the like, is that it allows the user to operate the device in a hands-free manner.

In one typical system, the user wakes the voice user interface from a low-power standby mode by speaking a trigger phrase. Speech recognition techniques are used to detect that the trigger phrase has been spoken and, separately, a first speaker recognition process is used to confirm that the trigger phrase was spoken by a registered user of the device.

The user may then speak a command, which can be recognised by the voice user interface using speech recognition techniques. A second speaker recognition process is used to confirm that the command was spoken by a registered user of the device.

The voice user interface may then act on that spoken command. For example, if the spoken command asks for publicly available information, the spoken command may be recognised, and used to generate a query to an internet search engine in order to be able to supply that information to the user.

However, in other cases, for example if the spoken command relates to personal information, the level of authentication provided by the first and second speaker recognition processes performed on the trigger phrase and on the command may be considered insufficient for the voice user interface to act on that command.

SUMMARY OF THE INVENTION

According to the embodiments described herein, there is provided a method and a system which reduce or avoid one or more of the disadvantages mentioned above.

According to a first aspect of the invention, there is provided a method of speaker recognition, the method comprising: receiving an audio signal representing speech; performing a speaker change detection process on the received audio signal; attempting to detect a trigger phrase in the received audio signal; and, on detecting the trigger phrase in the received audio signal, performing a speaker recognition process on the detected trigger phrase and on any speech preceding the detected trigger phrase and following an immediately preceding speaker change.

The method may comprise: performing a first speaker recognition process on the detected trigger phrase; performing a second speaker recognition process on speech preceding the detected trigger phrase and following an immediately preceding speaker change; and fusing results of the first and second speaker recognition processes. The first speaker recognition process may be a text-dependent speaker recognition process and the second speaker recognition process may be a text-independent speaker recognition process.

The method may further comprise: performing the speaker recognition process on speech following the detected trigger phrase and preceding an immediately following speaker change.

The method may comprise: performing a first speaker recognition process on the detected trigger phrase; performing a second speaker recognition process on speech preceding the detected trigger phrase and following an immediately preceding speaker change and on speech following the detected trigger phrase and preceding an immediately following speaker change; and fusing results of the first and second speaker recognition processes. The first speaker recognition process may be a text-dependent speaker recognition process and the second speaker recognition process may be a text-independent speaker recognition process.

The method may comprise: performing a first speaker recognition process on the detected trigger phrase; performing a second speaker recognition process on speech preceding the detected trigger phrase and following an immediately preceding speaker change; performing a third speaker recognition process on speech following the detected trigger phrase and preceding an immediately following speaker change; and fusing results of the first, second and third speaker recognition processes. The first speaker recognition process may be a text-dependent speaker recognition process and the second and third speaker recognition processes may be text-independent speaker recognition processes.

The method may comprise: buffering the received audio signal; and retrieving the buffered audio signal on detecting the trigger phrase in the received audio signal. The method may comprise buffering the received audio signal for a fixed time period on a first-in, first-out basis.

The method may comprise performing the speaker change detection process on the received audio signal continuously, and generating a speaker change detection flag when a speaker change is recognised.

The method may comprise performing the speaker change detection process on the received audio signal after retrieving the buffered audio signal in response to detecting the trigger phrase in the received audio signal.

The speaker change detection process may be based on a detected angle of arrival of sound that gives rise to the audio signal, and/or may be based on a detected characteristic frequency of the speech, and/or may be based on extracting feature vectors for respective time windows of the received audio signal, and determining when a statistical difference between feature vectors of successive time windows exceeds a threshold.

The method may further comprise: on detecting the trigger phrase in the received audio signal, no longer attempting to detect the trigger phrase in the received audio signal.

The speaker recognition process may determine whether the received audio signal is derived from the speech of an enrolled user, the method further comprising, if it is determined that the received audio signal is derived from the speech of an enrolled user: performing a speech recognition process on speech following the detected trigger phrase. The method may further comprise extracting a command from the speech following the detected trigger phrase.

According to an aspect of the invention, there is provided a speaker recognition system, comprising: an input, for receiving an audio signal representing speech; and wherein the system is configured for: performing a speaker change detection process on the received audio signal; attempting to detect a trigger phrase in the received audio signal; and, on detecting the trigger phrase in the received audio signal, performing a speaker recognition process on the detected trigger phrase and on any speech preceding the detected trigger phrase and following an immediately preceding speaker change.

According to another aspect of the invention, there is provided a device comprising such a speaker recognition system. The device may comprise a mobile telephone, an audio player, a video player, a mobile computing platform, a games device, a remote controller device, a toy, a machine, or a home automation controller or a domestic appliance.

The invention also provides a non-transitory computer readable storage medium having computer-executable instructions stored thereon that, when executed by processor circuitry, cause the processor circuitry to perform any of the methods set out above.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals, or may provide information indicating whether a speaker is or is not a particular individual, for the purposes of identification or authentication. Speech recognition refers to a technique for determining the content and/or the meaning of what is spoken, rather than recognising the person speaking.

Figure 1:
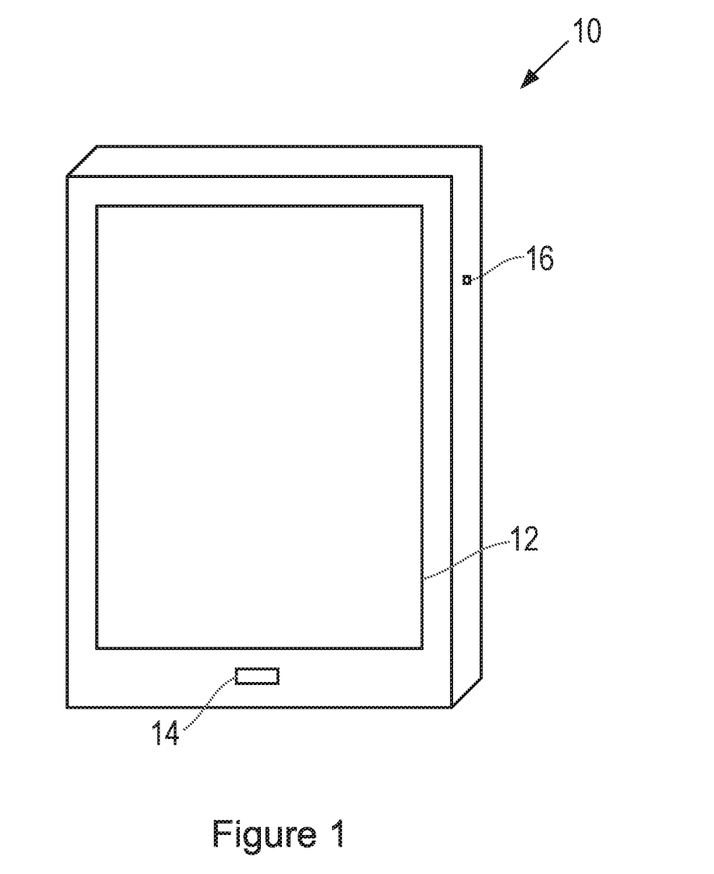
FIG. 1 is a schematic view of an electronic device.

FIG. 1 shows a device in accordance with one aspect of the invention. The device may be any suitable type of device, such as a mobile computing device, for example a laptop or tablet computer, a games console, a remote control device, a home automation controller or a domestic appliance including a domestic temperature or lighting control system, a toy, a machine such as a robot, an audio player, a video player, or the like, but in this illustrative example the device is a mobile telephone, and specifically a smartphone 10. The smartphone 10 may, by suitable software, be used as the control interface for controlling any other further device or system.

The smartphone 10 includes a screen 12 for displaying information to a user, a sound inlet 14, for allowing sound to be detected by a microphone, and a jack socket 16, or other port or receptacle, for allowing an accessory to be connected to the device.

Figure 2:
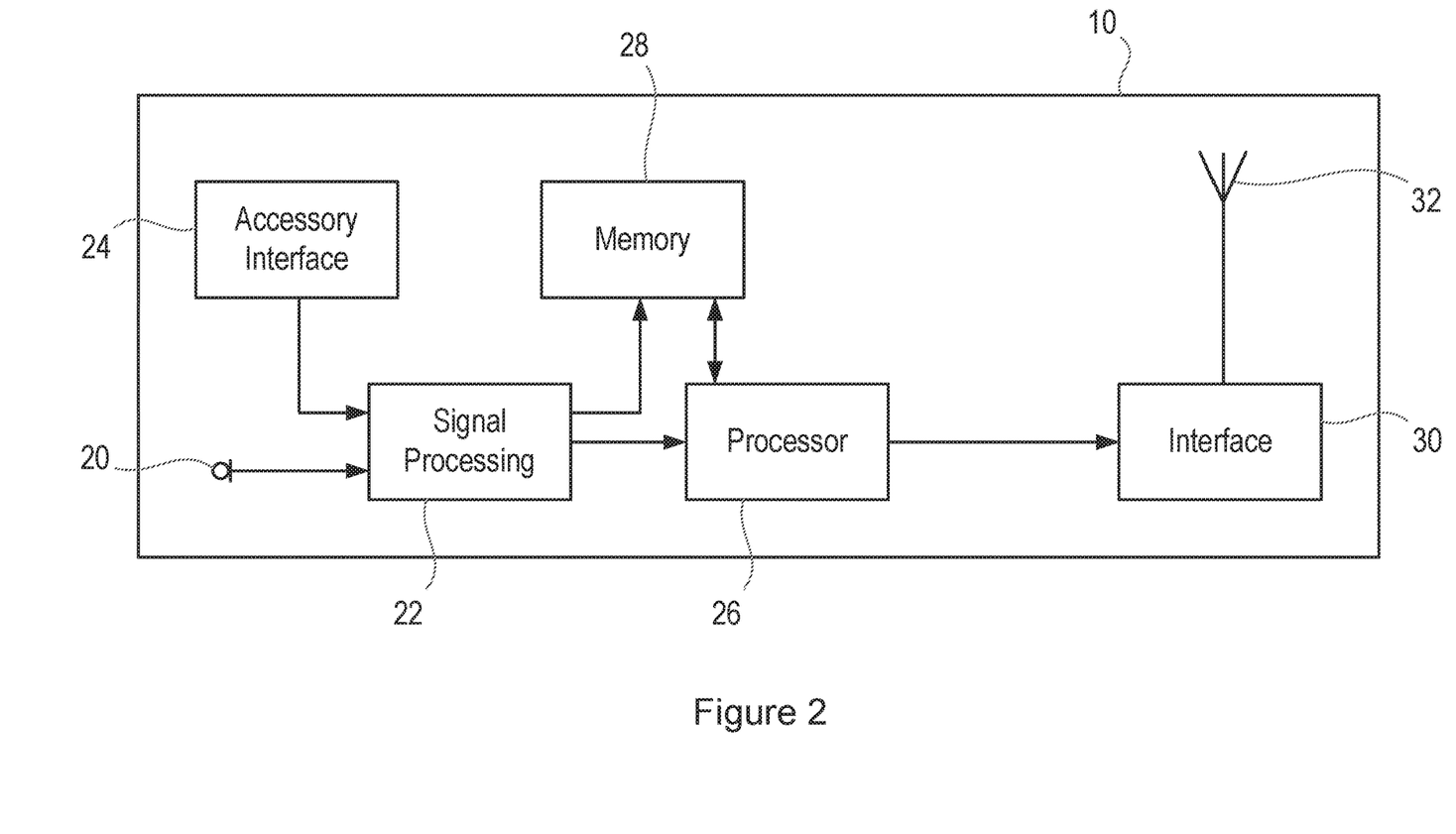
FIG. 2 is a further schematic diagram of an electronic device.

FIG. 2 is a schematic diagram showing the smartphone 10. In this example, the smartphone 10 includes a microphone 20, which may for example be located close to the sound inlet 14 shown in FIG. 1. Electronic signals generated by the microphone are passed to a signal processing block 22, which performs initial signal processing of the signals, for example converting analog signals received from the microphone 20 into digital signals.

The smartphone 10 also includes an accessory interface 24, which may for example be located close to the jack socket 16 shown in FIG. 1. The jack socket 16 and the interface 24 may be suitable for allowing a headset accessory to be connected thereto, and signals received from a microphone on such an accessory are also passed to the signal processing block 22, which performs initial signal processing of the signals.

The signal processing block 22 is connected to a processor 26, which performs methods as described herein on the basis of data and program instructions stored in a memory 28. Specifically, the methods described herein can be performed on the processor 26 by executing instructions that are stored in non-transient form in the memory 28, with the program instructions being stored either during manufacture of the device 10 or by upload while the device 10 is in use.

The processor 26 is connected to an interface 30, which is itself connected to an antenna 32, allowing signals to be transmitted and received over an external network to remote devices.

In other examples, the device performing the processes described herein may receive the required input signals in a suitable form, without needing to perform any prior signal detection or signal processing and thus not requiring the device to comprise signal processing block 22.

In some examples, some of the processing described below may be performed on an external device communicating via an external network, for example a remote computing server or a server in a home network. In other examples, all of the processing described below may be performed in a single device, without requiring the device to comprise any interface to any external device or network.

Figure 3:
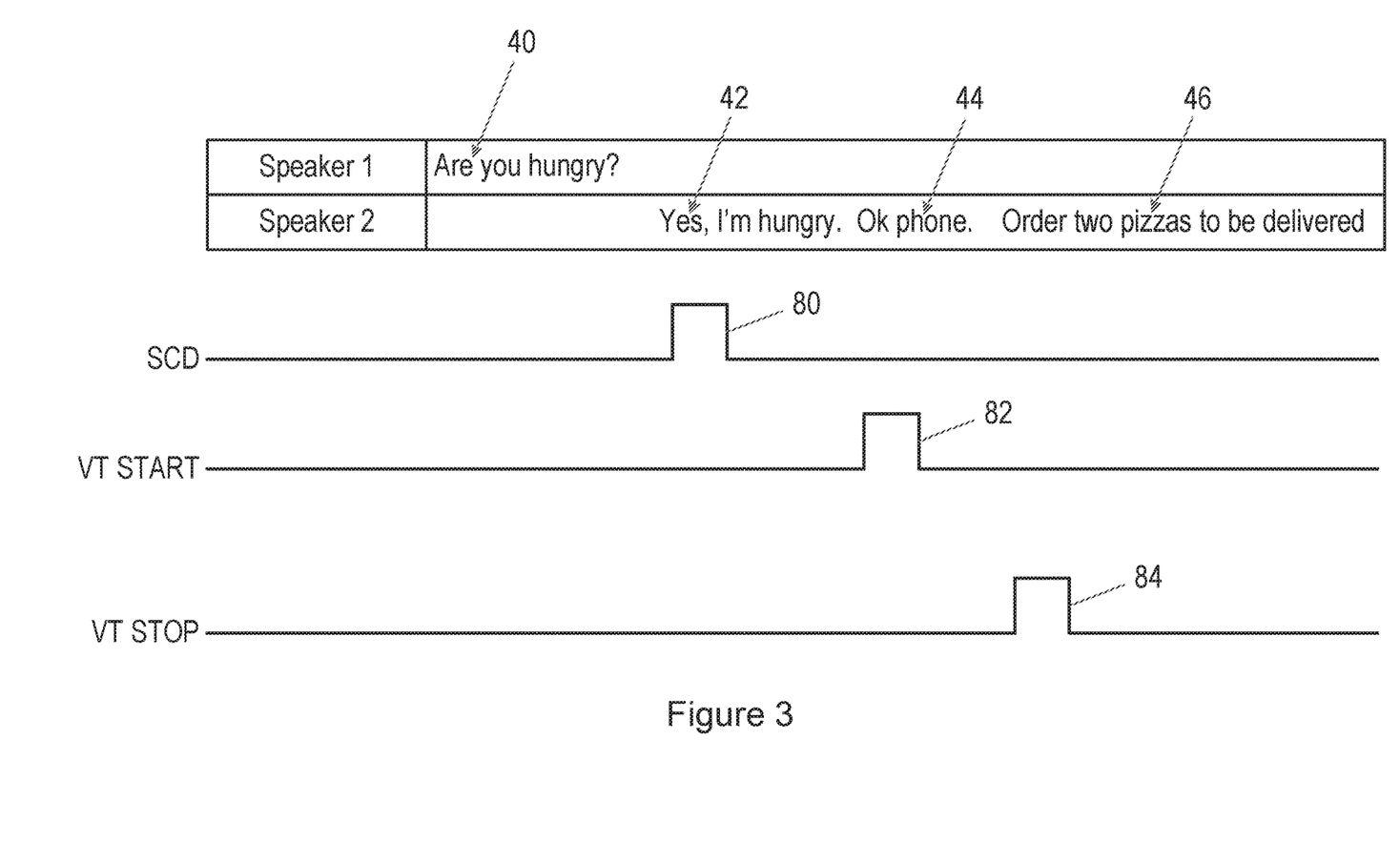
FIG. 3 illustrates speech that might be detected by an electronic device, and the method of operation of the device.

FIG. 3 illustrates a situation in which two people are holding a conversation, during which one of them issues a command to a voice user interface on the device 10.

Thus, as shown at 40 in FIG. 3, speaker 1 asks speaker 2 "Are you hungry?" As shown at 42, speaker 2 replies to speaker 1 "Yes, I am hungry". Speaker 2 decides to order some food using the voice user interface. Therefore, as shown at 44, speaker 2 says the trigger phrase "OK phone" that is used to activate the voice user interface. Then, as shown at 46, speaker 2 issues the command to the voice user interface "Order two pizzas to be delivered".

The operation of the voice user interface in response to this interaction is described in more detail below.

Figure 4:
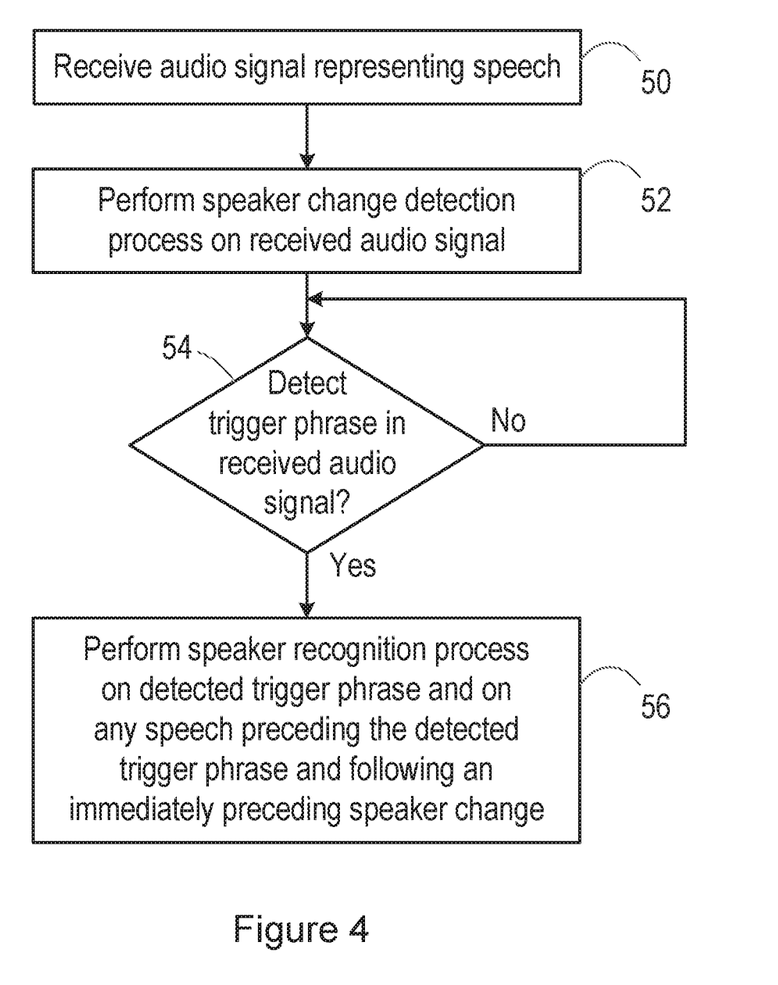
FIG. 4 is a flow chart, illustrating a method.
Figure 5:
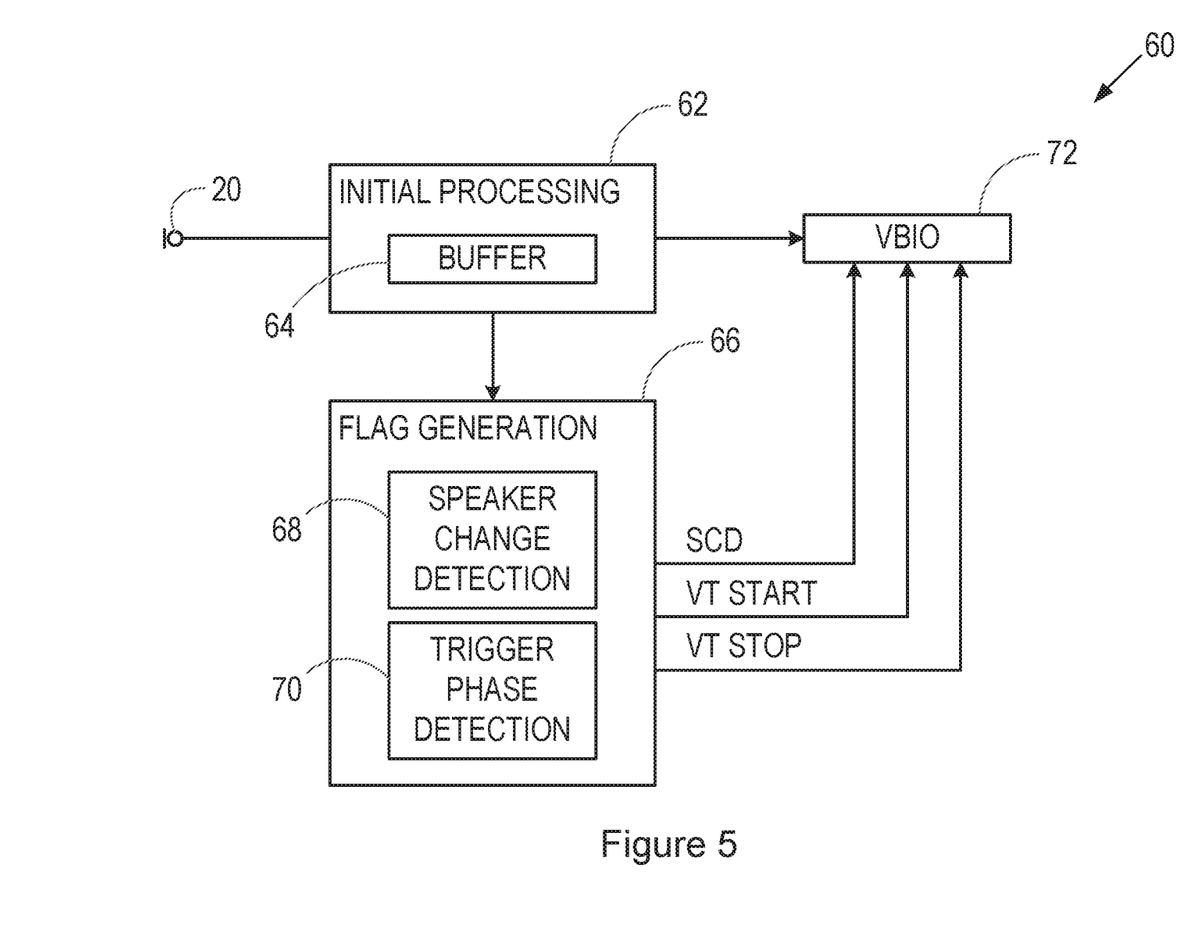
FIG. 5 is a block diagram, illustrating a processing system.

FIG. 4 is a flow chart illustrating the operation of the voice user interface, and FIG. 5 is a block diagram illustrating the form of the relevant parts of the voice user interface system 60.

As described in more detail below, the process shown in FIG. 4 is performed after a user has registered with the system, for example by providing one or more sets of voice samples that can be used to form one or more model of the user's speech. Typically, the registration or enrolment process requires the user to provide speech inputs, and then uses these speech inputs to form a model of the user's speech, starting from a particular background model defined in a prior development phase. Thus, the background model and the speech inputs are the inputs to the enrolment process that is used to form the model of the user's speech. Subsequently, during verification, as described in more detail below, further speech inputs are compared with the model of the user's speech, and with a background model, in order to provide an output. An output of this comparison may for example be a numerical value indicating a likelihood that the speech inputs received during the verification phase were provided by the same user that provided the speech inputs during enrolment. The numerical value indicative of the likelihood may be for example a log likelihood ratio (LLR) or may be some more indirect indication, for example a metric of distance of extracted features of the speech sample from some one- or multi-dimensional threshold.

As shown in FIG. 5, a microphone 20, for example one of the microphones in a device 10, detects a sound, and this is passed to an initial processing block 62 of the voice user interface system 60. This initial processing block 62 may for example include an analog-digital converter, for converting signals received from an analog microphone into digital form, and also includes a buffer 64, for storing signals.

Thus, in step 50 of the process shown in FIG. 4, the voice user interface 60 receives the audio signal generated by the microphone 20. The received audio signal will depend on the sounds that are detected by the microphone 20, which may include the speech of one or more people, plus associated background sounds.

As is conventional, this received audio signal is divided into frames, for example of 20 ms duration. It is then determined using a voice activity detection technique whether the audio signal represents speech. Parts of the received audio signal that represent speech are stored in the buffer 64.

The buffer 64 may, for example, store the parts of the received audio signal representing speech for a fixed time period on a first-in, first-out basis. For example, the buffer 64 may be able to store at least 5 seconds, or at least 10 seconds, of speech.

The parts of the received audio signal representing speech are also passed to an analysis and flag generation block 66. As shown in FIG. 5, the flag generation block 66 includes a speaker change detection block 68 and a trigger phrase detection block 70.

Thus, in the flow chart of FIG. 4, in step 52, a speaker change detection process is performed on the parts of the received audio signal representing speech. This speaker change detection process runs continuously, and generates a flag whenever it is determined that the identity of the person speaking has changed.

For example, in a device 10 that has multiple microphones, the signals generated by the multiple microphones may be analysed. More specifically, the time differences between the arrivals of the sounds at the microphones may be analysed, in order to obtain information about the angle of arrival of the sound that gives rise to the received audio signal. A change in the identity of the speaker may be inferred in whole or in part based on a change in this angle of arrival.

Alternatively, or additionally, the frequency content of the received audio signal representing speech may be analysed.

A change in the identity of the speaker may be inferred in whole or in part based on a detected characteristic frequency of the speech, for example the fundamental frequency F0.

Alternatively, or additionally, feature vectors may be extracted from the received audio signal representing speech. Examples of possible feature vectors are Mel Frequency Cepstral Coefficients (MFCCs) or formants. The frequency vectors may be extracted for respective time windows of the received audio signal. Then, a change in the identity of the speaker may be inferred in whole or in part based on a dissimilarity between feature vectors of successive time windows. For example, a change in the identity of the speaker may be inferred in whole or in part when a statistical difference between feature vectors of successive time windows exceeds a threshold. This method is described in Ajmera et al.; Robust speaker change detection; IEEE Signal Processing Letters; Volume: 11 Issue: 8; 26 Jul. 2004.

Thus, returning to FIG. 3, when the second speaker starts speaking after the first speaker had been speaking, a speaker change detection (SCD) flag 80 is generated.

Also, in the flow chart of FIG. 4, in step 54 a trigger phrase detection process is performed on the parts of the received audio signal representing speech. This trigger phrase detection process runs continuously, and generates a voice trigger start flag and a voice trigger stop flag to mark the beginning and end of the trigger phrase.

Thus, returning to FIG. 3, when the trigger phrase is spoken, a voice trigger start (VT START) flag 82 is generated and used to mark the beginning of the trigger phrase, and a voice trigger stop (VT STOP) flag 84 is generated and used to mark the end of the trigger phrase.

As is known, a relatively crude speech recognition system can be used to determine when the speech in the received audio signal represents the trigger phrase. This is a computationally easier task than identifying the content of unknown speech. Further, it is possible to accept a trigger phrase detection process with a relatively high False Acceptance Rate, because the consequences of falsely determining that the trigger phrase has been spoken are not severe.

Flags that are generated by the flag generation block 66 are passed to a voice biometric (VBIO) processing block 72.

Then, in the flow chart of FIG. 4, in step 56, when the trigger phrase is detected in the received audio signal, a speaker recognition process is performed. Specifically, the speaker recognition process is performed on the detected trigger phrase and also on speech preceding the detected trigger phrase and following an immediately preceding speaker change.

As shown in FIG. 3, the start and end of the trigger phrase 44 are indicated by the voice trigger start (VT START) flag 82 and the voice trigger stop (VT STOP) flag 84 respectively. The data representing that part of the received speech signal can be retrieved from the buffer 64, and analysed by the voice biometric processing block 72.

In addition, any other speech 42 following the speaker change detection flag 80 is also assumed to have been spoken by the same speaker as the trigger phrase. The data representing that part of the received speech signal can also be retrieved from the buffer 64, and analysed by the voice biometric processing block 72.

In some embodiments, a first speaker recognition process is performed on the detected trigger phrase, and a different second speaker recognition process is performed on speech preceding the detected trigger phrase and following the immediately preceding speaker change. For example, the first speaker recognition process may be a text-dependent speaker recognition process, because it relate to the predetermined trigger phrase, while the second speaker recognition process is a text-independent speaker recognition process.

Then, the results of the first and second speaker recognition processes may be fused. For example, if each of the first and second speaker recognition processes generates a score relating to the likelihood that the speech was produced by a particular enrolled speaker, then a final result may be obtained by forming a weighted sum of the scores generated by the first and second speaker recognition processes.

This method of using the speech of the enrolled speaker that precedes the trigger phrase allows the result of the speaker recognition process to be obtained quickly and with reasonable accuracy.

In some embodiments, speech that follows the detected trigger phrase is also retrieved from the buffer 64, and analysed by the voice biometric processing block 72, provided that there is no intervening speaker change. During this period, after detecting the trigger phrase in the received audio signal, the trigger phrase detection process may be halted, for example until a time-out period has expired, as it is no longer necessary to attempt to detect the trigger phrase in the received audio signal at this time.

Thus, in the situation shown in FIG. 3, data representing the speech 46 is also retrieved from the buffer 64, and analysed by the voice biometric processing block 72. Data representing further speech can also be analysed by the voice biometric processing block 72, provided that there is no detected speaker change.

In this case, one possibility is that a first speaker recognition process is performed on the detected trigger phrase. Meanwhile, the speech preceding the detected trigger phrase and following an immediately preceding speaker change and the speech following the detected trigger phrase and preceding an immediately following speaker change are concatenated, and a second speaker recognition process is performed on that speech. For example, the first speaker recognition process may be a text-dependent speaker recognition process, because it relate to the predetermined trigger phrase, while the second speaker recognition process is a text-independent speaker recognition process.

Then, the results of the first and second speaker recognition processes may be fused. For example, if each of the first and second speaker recognition processes generates a score relating to the likelihood that the speech was produced by a particular enrolled speaker, then a final result may be obtained by forming a weighted sum of the scores generated by the first and second speaker recognition processes.

An alternative possibility is that: a first speaker recognition process is performed on the detected trigger phrase; a second speaker recognition process is performed on the speech preceding the detected trigger phrase and following the immediately preceding speaker change; and a third speaker recognition process is performed on the speech following the detected trigger phrase and preceding the immediately following speaker change. For example, the first speaker recognition process may be a text-dependent speaker recognition process, because it relate to the predetermined trigger phrase, while the second and third speaker recognition processes are text-independent speaker recognition processes.

Then, the results of the first, second and third speaker recognition processes may be fused. For example, if each of the first, second and third speaker recognition processes generates a score relating to the likelihood that the speech was produced by a particular enrolled speaker, then a final result may be obtained by forming a weighted sum of the scores generated by the first, second and third speaker recognition processes.

Methods in which speech preceding the trigger phrase is also taken into account, when determining whether a specific enrolled speaker was speaking, will generally produce more reliable results than methods in which only the trigger phrase and the command are used in the voice biometric process, because increasing the amount of data being considered should provide a greater degree of certainty in the result of the speaker recognition.

In the embodiments described above, the speaker change detection process runs continuously, and generates a flag whenever it is determined that the identity of the person speaking has changed. At the same time, the trigger phrase detection process is also performed continuously, and generates a voice trigger start flag and a voice trigger stop flag to mark the beginning and end of the trigger phrase.

In other embodiments, while the trigger phrase detection process is performed continuously, and generates a voice trigger start flag and a voice trigger stop flag to mark the beginning and end of the trigger phrase, the speaker change detection process is only performed when the trigger phrase is detected.

Figure 6:
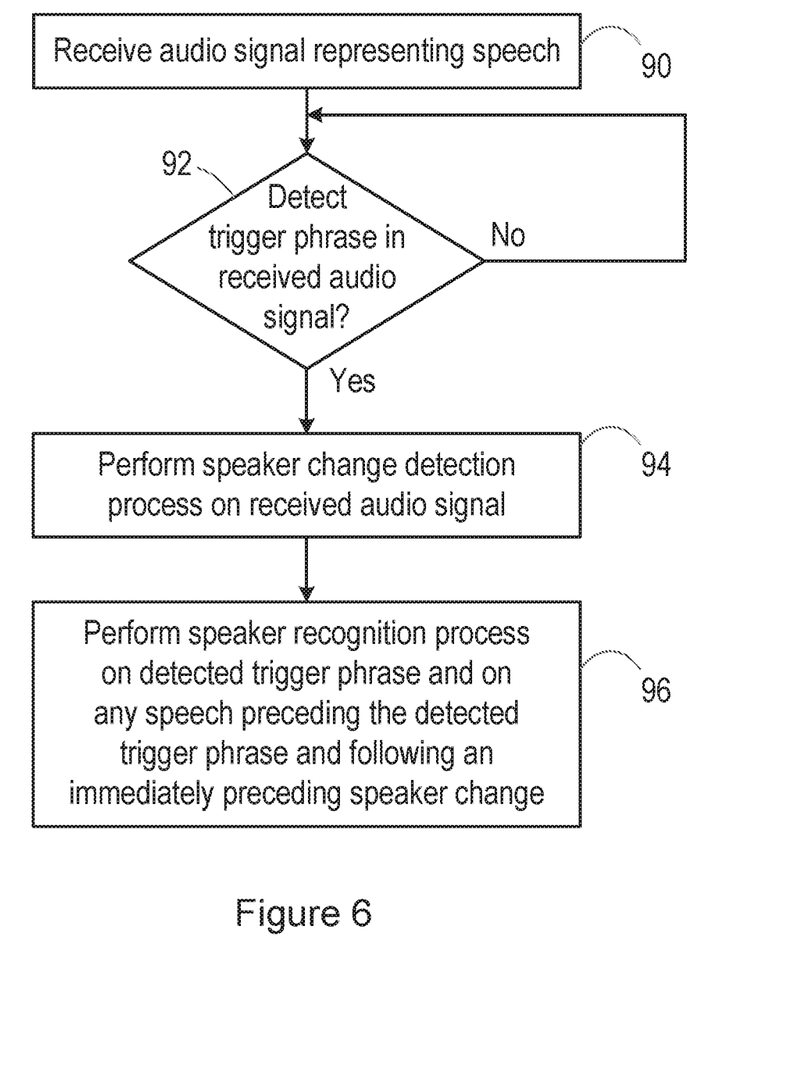
FIG. 6 is a flow chart, illustrating an alternative method.

FIG. 6 is a flow chart illustrating the operation of the voice user interface in such other embodiments, and again FIG. 5 illustrates the form of the relevant parts of the voice user interface system 60.

As in FIG. 4, the process shown in FIG. 6 is performed after a user has registered with the system, for example by providing one or more sets of voice samples that can be used to form one or more model of the user's speech. Typically, the registration or enrolment process requires the user to provide speech inputs, and then uses these speech inputs to form a model of the user's speech, starting from a particular background model defined in a prior development phase. Thus, the background model and the speech inputs are the inputs to the enrolment process that is used to form the model of the user's speech. Subsequently, during verification, as described in more detail below, further speech inputs are compared with the model of the user's speech, and with a background model, in order to provide an output. An output of this comparison may for example be a numerical value indicating a likelihood that the speech inputs received during the verification phase were provided by the same user that provided the speech inputs during enrolment. The numerical value indicative of the likelihood may be for example a log likelihood ratio (LLR) or may be some more indirect indication, for example a metric of distance of extracted features of the speech sample from some one- or multi-dimensional threshold.

As shown in FIG. 5, a microphone 20, for example one of the microphones in a device 10, detects a sound, and this is passed to an initial processing block 62 of the voice user interface system 60. This initial processing block 62 may for example include an analog-digital converter, for converting signals received from an analog microphone into digital form, and also includes a buffer 64, for storing signals.

Thus, in step 90 of the process shown in FIG. 6, the voice user interface 60 receives the audio signal generated by the microphone 20. The received audio signal will depend on the sounds that are detected by the microphone 20, which may include the speech of one or more people, plus associated background sounds.

As is conventional, this received audio signal is divided into frames, for example of 20 ms duration. It is then determined using a voice activity detection technique whether the audio signal represents speech. Parts of the received audio signal that represent speech are stored in the buffer 64.

The buffer 64 may, for example, store the parts of the received audio signal representing speech for a fixed time period on a first-in, first-out basis. For example, the buffer 64 may be able to store at least 5 seconds, or at least 10 seconds, of speech.

The parts of the received audio signal representing speech are also passed to an analysis and flag generation block 66. As shown in FIG. 5, the flag generation block 66 includes a speaker change detection block 68 and a trigger phrase detection block 70.

Thus, in the flow chart of FIG. 6, in step 92, a trigger phrase detection process is performed on the parts of the received audio signal representing speech. This trigger phrase detection process runs continuously, and generates a voice trigger start flag and a voice trigger stop flag to mark the beginning and end of the trigger phrase.

Thus, returning to FIG. 3, when the trigger phrase is spoken, a voice trigger start (VT START) flag 82 is generated and used to mark the beginning of the trigger phrase, and a voice trigger stop (VT STOP) flag 84 is generated and used to mark the end of the trigger phrase.

As is known, a relatively crude speech recognition system can be used to determine when the speech in the received audio signal represents the trigger phrase. This is a computationally easier task than identifying the content of unknown speech. Further, it is possible to accept a trigger phrase detection process with a relatively high False Acceptance Rate, because the consequences of falsely determining that the trigger phrase has been spoken are not severe.

In response to detecting the trigger phrase in the received audio signal, the process of FIG. 6 passes to step 94, in which the buffered audio signal is retrieved, and a speaker change detection process is performed on the retrieved buffered audio signal. More specifically, the speaker change detection process attempts to detect a point in time during that retrieved buffered audio signal, either at the start of the trigger phrase or before the start of the trigger phrase, at which the identity of the person speaking has changed. This speaker change detection process generates a flag whenever it is determined that the identity of the person speaking has changed.

There are several techniques for performing speaker change detection. For example, in a device 10 that has multiple microphones, the signals generated by the multiple microphones may be analysed. More specifically, the time differences between the arrivals of the sounds at the microphones may be analysed, in order to obtain information about the angle of arrival of the sound that gives rise to the received audio signal. A change in the identity of the speaker may be inferred in whole or in part based on a change in this angle of arrival.

Alternatively, or additionally, the frequency content of the received audio signal representing speech may be analysed. A change in the identity of the speaker may be inferred in whole or in part based on a detected characteristic frequency of the speech, for example the fundamental frequency F0.

Alternatively, or additionally, feature vectors may be extracted from the received audio signal representing speech. Examples of possible feature vectors are Mel Frequency Cepstral Coefficients (MFCCs) or formants. The frequency vectors may be extracted for respective time windows of the received audio signal. Then, a change in the identity of the speaker may be inferred in whole or in part based on a dissimilarity between feature vectors of successive time windows. For example, a change in the identity of the speaker may be inferred in whole or in part when a statistical difference between feature vectors of successive time windows exceeds a threshold. This method is described in Ajmera et al.; Robust speaker change detection; IEEE Signal Processing Letters; Volume: 11 Issue: 8; 26 Jul. 2004.

Thus, returning to FIG. 3, when the second speaker starts speaking after the first speaker had been speaking, a speaker change detection (SCD) flag 80 is generated.

Flags that are generated by the flag generation block 66 are passed to a voice biometric (VBIO) processing block 72.

Then, in the flow chart of FIG. 6, in step 96, when the trigger phrase is detected in the received audio signal, a speaker recognition process is performed. Specifically, the speaker recognition process is performed on the detected trigger phrase and also on speech preceding the detected trigger phrase and following an immediately preceding speaker change.

As shown in FIG. 3, the start and end of the trigger phrase 44 are indicated by the voice trigger start (VT START) flag 82 and the voice trigger stop (VT STOP) flag 84 respectively. The data representing that part of the received speech signal can be retrieved from the buffer 64, and analysed by the voice biometric processing block 72.

In addition, any other speech 42 following the speaker change detection flag 80 is also assumed to have been spoken by the same speaker as the trigger phrase. The data representing that part of the received speech signal can also be retrieved from the buffer 64, and analysed by the voice biometric processing block 72.

In some embodiments, a first speaker recognition process is performed on the detected trigger phrase, and a different second speaker recognition process is performed on speech preceding the detected trigger phrase and following the immediately preceding speaker change. For example, the first speaker recognition process may be a text-dependent speaker recognition process, because it relate to the predetermined trigger phrase, while the second speaker recognition process is a text-independent speaker recognition process.

Then, the results of the first and second speaker recognition processes may be fused. For example, if each of the first and second speaker recognition processes generates a score relating to the likelihood that the speech was produced by a particular enrolled speaker, then a final result may be obtained by forming a weighted sum of the scores generated by the first and second speaker recognition processes.

This method of using the speech of the enrolled speaker that precedes the trigger phrase allows the result of the speaker recognition process to be obtained quickly and with reasonable accuracy.

In some embodiments, speech that follows the detected trigger phrase is also retrieved from the buffer 64, and analysed by the voice biometric processing block 72, provided that there is no intervening speaker change. During this period, after detecting the trigger phrase in the received audio signal, the trigger phrase detection process may be halted, for example until a time-out period has expired, as it is no longer necessary to attempt to detect the trigger phrase in the received audio signal at this time.

Thus, in the situation shown in FIG. 3, data representing the speech 46 is also retrieved from the buffer 64, and analysed by the voice biometric processing block 72. Data representing further speech can also be analysed by the voice biometric processing block 72, provided that there is no detected speaker change.

In this case, one possibility is that a first speaker recognition process is performed on the detected trigger phrase. Meanwhile, the speech preceding the detected trigger phrase and following an immediately preceding speaker change and the speech following the detected trigger phrase and preceding an immediately following speaker change are concatenated, and a second speaker recognition process is performed on that speech. For example, the first speaker recognition process may be a text-dependent speaker recognition process, because it relate to the predetermined trigger phrase, while the second speaker recognition process is a text-independent speaker recognition process.

Then, the results of the first and second speaker recognition processes may be fused. For example, if each of the first and second speaker recognition processes generates a score relating to the likelihood that the speech was produced by a particular enrolled speaker, then a final result may be obtained by forming a weighted sum of the scores generated by the first and second speaker recognition processes.

An alternative possibility is that: a first speaker recognition process is performed on the detected trigger phrase; a second speaker recognition process is performed on the speech preceding the detected trigger phrase and following the immediately preceding speaker change; and a third speaker recognition process is performed on the speech following the detected trigger phrase and preceding the immediately following speaker change. For example, the first speaker recognition process may be a text-dependent speaker recognition process, because it relate to the predetermined trigger phrase, while the second and third speaker recognition processes are text-independent speaker recognition processes.

Then, the results of the first, second and third speaker recognition processes may be fused. For example, if each of the first, second and third speaker recognition processes generates a score relating to the likelihood that the speech was produced by a particular enrolled speaker, then a final result may be obtained by forming a weighted sum of the scores generated by the first, second and third speaker recognition processes.

Methods in which speech preceding the trigger phrase is also taken into account, when determining whether a specific enrolled speaker was speaking, will generally produce more reliable results than methods in which only the trigger phrase and the command are used in the voice biometric process, because increasing the amount of data being considered should provide a greater degree of certainty in the result of the speaker recognition.

Thus, in the embodiment illustrated in FIG. 6, when it is determined that the trigger phrase has been spoken, the buffered received audio signal from the period before the trigger phrase is retrieved and the speaker change detection process is performed on that data. Then, a speaker change either at the start of the trigger phrase or before the start of the trigger phrase is identified. If the identified speaker change occurred before the start of the trigger phrase, then any speech from the period between that speaker change and the start of the trigger phrase may be taken into account when determining whether the trigger phrase was spoken by the enrolled user.

Performing the speaker change detection process only when the trigger phrase has been detected reduces the power consumption, compared with performing both the speaker change detection process and the trigger phrase detection process continuously.

The output of the voice biometric processing block 72 is a determination as to whether the speech is the speech of a specific enrolled user. If it is determined that the received audio signal is derived from the speech of an enrolled user, a speech recognition process (not shown in FIG. 5) may be performed. The speech recognition process may be performed in the device 10, or may be provided in a remote device, for example in the cloud. For example, the speech recognition process may be performed on the speech 46 that follows the detected trigger phrase 44, on the assumption that this will likely be a command that has been spoken by the user. The command that is extracted by the speech recognition process can then be used to control a further process in the device 10, or the device 10 can send a suitable control signal to a separate device.

In addition, the speech recognition process may be performed on the detected trigger phrase 44 itself, because it will likely be possible to access a speech recognition process that has a lower error rate than the basic speech recognition process that is used as a trigger phrase detection process. Thus, this can be used to confirm that it was indeed the trigger phrase that was spoken, as would typically be required before any spoken command is acted upon.

Thus, the process of speaker recognition is able to take into account the speech that occurs before the trigger phrase. Using more of the user's speech should improve the reliability of the speaker recognition decision that is made.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker recognition, the method comprising:
receiving an audio signal representing speech;
buffering the received audio signal;
attempting to detect a predetermined trigger phrase in the received audio signal; and
in response to detecting the predetermined trigger phrase in the received audio signal:
retrieving the buffered audio signal;
performing a speaker change detection process on the received audio signal including the retrieved buffered audio signal; and
performing a speaker recognition process on the detected predetermined trigger phrase and on any speech preceding the detected predetermined trigger phrase and following an immediately preceding speaker change.

2. A method according to claim 1, comprising:
performing a first speaker recognition process on the detected predetermined trigger phrase;
performing a second speaker recognition process on speech preceding the detected predetermined trigger phrase and following an immediately preceding speaker change; and
fusing results of the first and second speaker recognition processes.

3. A method according to claim 2, wherein the first speaker recognition process is a text-dependent speaker recognition process and the second speaker recognition process is a text-independent speaker recognition process.

4. A method according to claim 1, further comprising:
performing the speaker recognition process on speech following the detected predetermined trigger phrase and preceding an immediately following speaker change.

5. A method according to claim 4, comprising:
performing a first speaker recognition process on the detected predetermined trigger phrase;
performing a second speaker recognition process on speech preceding the detected predetermined trigger phrase and following an immediately preceding speaker change and on speech following the detected predetermined trigger phrase and preceding an immediately following speaker change; and
fusing results of the first and second speaker recognition processes.

6. A method according to claim 5, wherein the first speaker recognition process is a text-dependent speaker recognition process and the second speaker recognition process is a text-independent speaker recognition process.

7. A method according to claim 4, comprising:
performing a first speaker recognition process on the detected predetermined trigger phrase;
performing a second speaker recognition process on speech preceding the detected predetermined trigger phrase and following an immediately preceding speaker change;
performing a third speaker recognition process on speech following the detected predetermined trigger phrase and preceding an immediately following speaker change; and
fusing results of the first, second and third speaker recognition processes.

8. A method according to claim 7, wherein the first speaker recognition process is a text-dependent speaker recognition process and the second and third speaker recognition processes are text-independent speaker recognition processes.

9. A method according to claim 1, comprising buffering the received audio signal for a fixed time period on a first-in, first-out basis.

10. A method according to claim 1, comprising performing the speaker change detection process on the received audio signal continuously, and generating a speaker change detection flag when a speaker change is recognised.

11. A method according to claim 1, wherein the speaker change detection process is based on a detected angle of arrival of sound that gives rise to the audio signal.

12. A method according to claim 1, wherein the speaker change detection process is based on a detected characteristic frequency of the speech.

13. A method according to claim 1, wherein the speaker change detection process is based on extracting feature vectors for respective time windows of the received audio signal, and determining when a statistical difference between feature vectors of successive time windows exceeds a threshold.

14. A method according to claim 1, further comprising:
on detecting the predetermined trigger phrase in the received audio signal, no longer attempting to detect the predetermined trigger phrase in the received audio signal.

15. A method according to claim 1, wherein the speaker recognition process determines whether the received audio signal is derived from the speech of an enrolled user, the method further comprising,
if it is determined that the received audio signal is derived from the speech of an enrolled user:
performing a speech recognition process on speech following the detected predetermined trigger phrase.

16. A method according to claim 15, further comprising extracting a command from the speech following the detected predetermined trigger phrase.

17. A speaker recognition system, comprising:
an input, for receiving an audio signal representing speech;
a buffer for storing the received audio signal;
and wherein the system is configured for:
attempting to detect a predetermined trigger phrase in the received audio signal; and
in response to detecting the predetermined trigger phrase in the received audio signal:
retrieving the stored audio signal;
performing a speaker change detection process on the received audio signal including the retrieved stored audio signal; and
performing a speaker recognition process on the detected predetermined trigger phrase and on any speech preceding the detected predetermined trigger phrase and following an immediately preceding speaker change.

18. A device comprising a speaker recognition system according to claim 17.

19. A non-transitory computer-readable medium, comprising code stored thereon, for causing a processor to perform a method comprising:
- receiving an audio signal representing speech;
- buffering the received audio signal;
- attempting to detect a predetermined trigger phrase in the received audio signal; and
- in response to detecting the predetermined trigger phrase in the received audio signal:
- retrieving the buffered audio signal;
- performing a speaker change detection process on the received audio signal including the retrieved buffered audio signal; and
- performing a speaker recognition process on the detected predetermined trigger phrase and on any speech preceding the detected predetermined trigger phrase and following an immediately preceding speaker change.

* * * * *